No. 889,509. PATENTED JUNE 2, 1908.
A. W. CRAM.
DOMESTIC COOKING VESSEL.
APPLICATION FILED SEPT. 27, 1906.
2 SHEETS—SHEET 1.
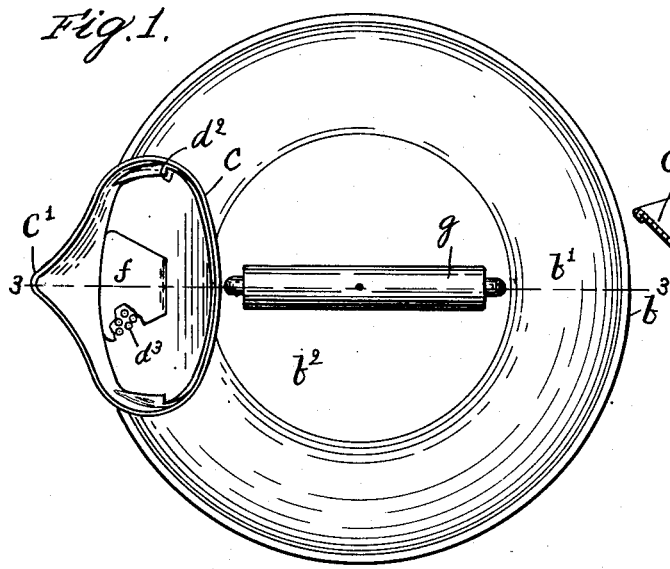
Fig. 1.
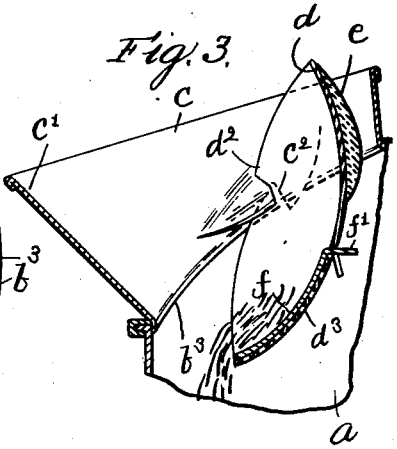
Fig. 3.
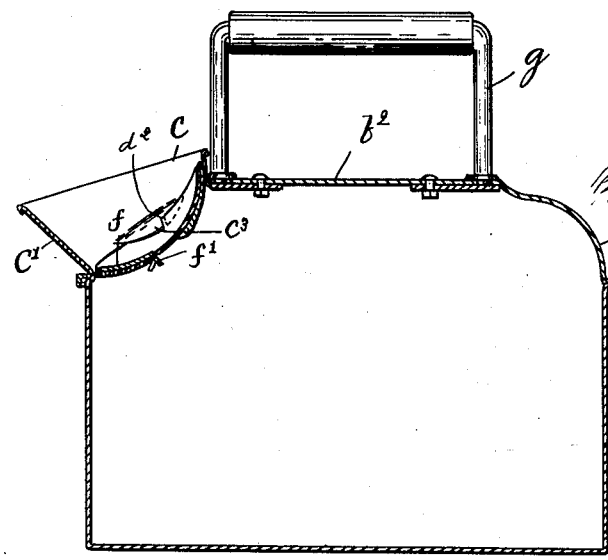
Fig. 2.
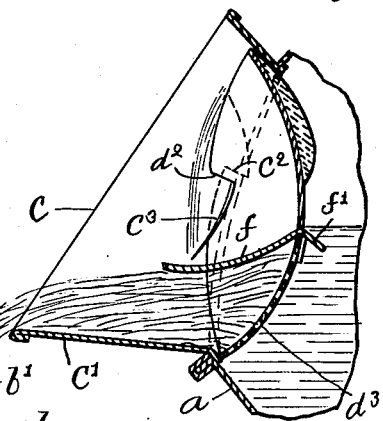
Fig. 4.
Fig. 5.
Witnesses:
H. B. Davis.
Cynthia Doyle.
Inventor:
A. W. Cram
by Noyes & Cushman
Attys No. 889,509. PATENTED JUNE 2, 1908.
A. W. CRAM.
DOMESTIC COOKING VESSEL.
APPLICATION FILED SEPT. 27, 1906.
2 SHEETS—SHEET 2.
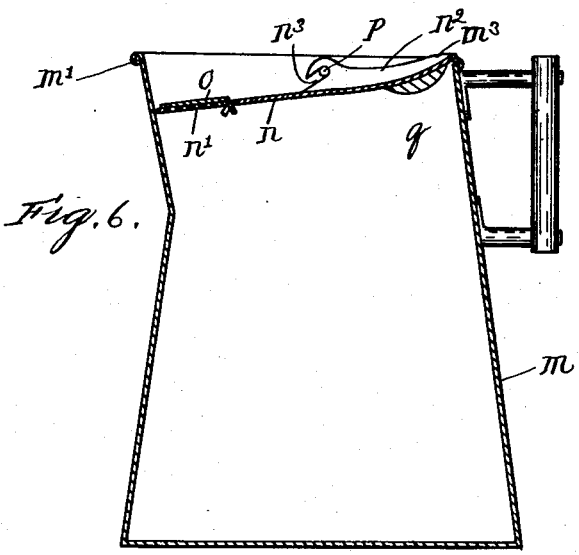
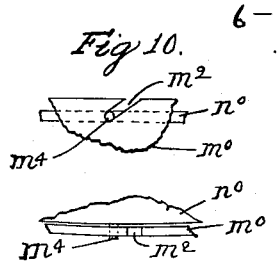
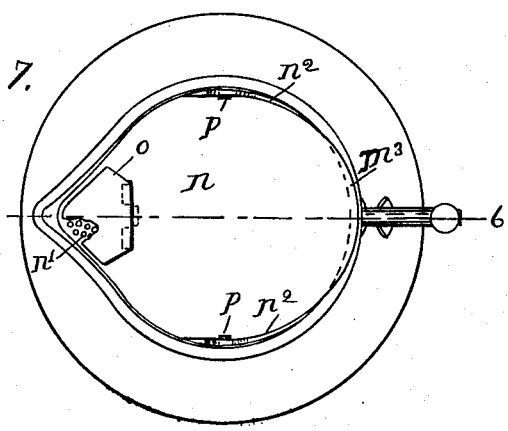
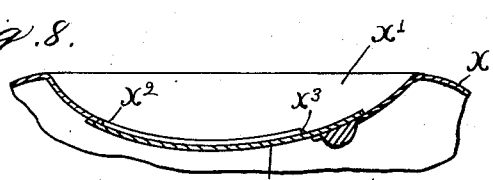
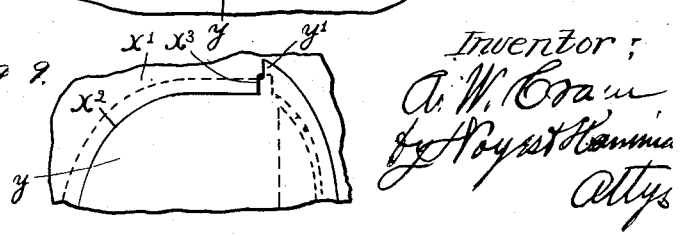
Witnesses:
H. B. Davis
Cynthia Doyle
Inventor;
A. W. Cram
by Poyst Hanna
Attys

ID="UNITED STATES PATENT OFFICE.

ALONZO W. CRAM, OF HAVERHILL, MASSACHUSETTS.

DOMESTIC COOKING VESSEL.

No. 889,509.

Specification of Letters Patent.

Patented June 2, 1908.

Application filed September 27, 1906. Serial No. 336,488.

*To all whom it may concern:*

Be it known that I, ALONZO W. CRAM, of Haverhill, county of Essex, State of Massachusetts, have invented an Improvement in Domestic Cooking Vessels, of which the following description, in connection with the accompanying drawings, is a specification, like characters on the drawings representing like parts.

This invention relates to certain improvements in domestic cooking vessels such as are ordinarily provided with covers, and more especially to such vessels as tea-kettles and coffee pots which must be filled somewhat frequently, and which are adapted to permit the liquid to be poured therefrom.

The invention further relates to certain improvements in that class of covers for vessels of the above character, which are adapted to be opened automatically by the weight of the liquid poured thereon to permit it to flow into the vessel, and to close automatically thereafter.

The principal objects of my invention are to reduce the cost of manufacture of these articles and at the same time to render them more hygienic by constructing them so that they may be more easily and thoroughly cleaned.

Another object of my invention is to produce a form of automatic cover which may be manufactured at less expense than certain forms which I have previously produced, which are also less likely to get out of order and which may be applied directly to the vessel without the employment of an intermediate insertible cup, as has been necessary with my said prior devices.

A further object of my invention is to provide an automatic cover of the above described character which may also perform the function of a strainer for the liquid as it is poured from the receptacle.

I accomplish these objects by the means shown in the accompanying drawings, in which, Figure 1 is a plan view of a tea kettle comprising my invention. Fig. 2 is a central sectional view thereof on the line 2—2, Fig. 1. Figs. 3 and 4 are enlarged detail sectional views, also taken on the line 2—2 of Fig. 1, showing the parts in different positions. Fig. 5 is a plan view, partly broken away, of the parts in the position of Fig. 3. Fig. 6 is a sectional view on the line 6—6, of Fig. 7, of the coffee pot provided with a modified form of my invention. Fig. 7 is a plan view of the device shown in Fig. 6. Figs. 8 and 9 are respectively sectional and plan views illustrating a modified form of my invention. Figs. 10 and 11 are respectively side elevation and plan views illustrating another modification.

The tea kettle body shown in Figs. 1 and 2, consists of a lower portion $a$ and a top portion tightly soldered thereto, as indicated at $b$. The top portion comprises an inclined side portion $b'$ and a horizontal top portion $b^2$, and an opening $b^3$, of approximately the size of the ordinary kettle opening, is formed in said inclined side portion $b'$. A spout $c$ is inserted in said opening $b^3$ and soldered in place, said spout being grooved and projected at the middle of its front side to form a pouring lip $c'$. Said opening is adapted to be closed by means of an automatically tipping cover or lid $d$, and to provide means for pivoting said lid I provide an inwardly projecting ear $c^3$ at each side of said opening, each having a slot or notch $c^2$ therein, disposed at opposite, corresponding points. Shoulders or lugs $d^2$ are provided at opposite sides of said cover, at points corresponding to the position of the notches $c^2$, the width of said cover from said shoulders to its front end being slightly less than the distance between the bottoms of said notches, and the thickness at the edges thereof between the same points being less than the width of said notches, so that it may be readily inserted in said opening with its edges in said notches, to bring its shoulders $d^2$ into engagement with the upper side of said ears $c^3$, or the inner side of the spout $c$. The cover will thus be pivotally supported on said shoulders $d^2$ and may swing thereon into the position to close the opening $b^3$, the slots $c^2$ being of sufficient width, and the ear portion in front thereof being raised above the portion in the rear thereof to a sufficient extent to permit said movement. In moving the cover to its closed position, the edge thereof in front of the pivotal shoulders $d^2$ swing into close proximity to the inner side of the spout, and the edge portion in the rear of said shoulders seat against the inner side of the spout, so that the opening $b^3$ is closed as tightly as is necessary. The cover is counterbalanced by means of the weight $e$, secured to the under side thereof, in the rear of the shoulders $d^2$, so that the cover will be normally held in its closed position. The area of the portion of the cover in front of its pivotal support is greater than the portion in the rear thereof, and as, in the construction shown in Figs. 1, 2 and 3, the cover is concave and is normally held so that its front portion is much more nearly horizontal than its rear portion, the area of the horizontal projection of the front portion of the cover is much greater than the area of the horizontal projection of its rear portion. With this construction therefore, when water is poured onto the cover, the weight of water in front of its pivotal supports is much greater than that in the rear thereof, and, as the weight $e$ is but little more than sufficient to hold the cover in its normal position, the weight will be at once overbalanced, and the cover will tip and permit the water to flow readily into the vessel, as shown in Fig. 3, the cover automatically returning to its normal position when the flow has ceased.

A valve plate $f$ is pivoted to the lower portion of the cover $d$ by means of a lug $f'$, which passes therethrough, and is suitably bent to hold it in place, said plate $f$ being concaved to correspond to the upper side of the cover, so that it may lie closely thereon and close a series of strainer apertures $d^3$ formed in cover $d$ beneath the same.

The kettle having been filled by pouring the water into the enlarged spout $c$, as above described, it may be emptied by pouring the water out of the spout in the ordinary manner, the water flowing through the strainer apertures $d^3$ and lifting the plate $f$, as shown in Fig. 4, the water pressure upon the inner side and lower portion of the cover acting to hold the same in its closed position. The water will thus be strained as it is poured out, and as the cover can be easily withdrawn from the opening, access can be readily had to the interior of the kettle to clean the same, while the strainer in the cover $d$ may also be easily cleaned. A kettle thus constructed may be made at materially less expense than those having the usual cover and spout, and, in addition to the advantages from the hygienic point of view, I am enabled to employ a rigid unjointed bail handle $g$ which is constantly held upright, so that it will not become too hot to be held in the hand. If, however, it is desired to apply my invention to a ketttle having the ordinary discharge spout leading from a point near the bottom, the top opening will be provided in the middle in the ordinary manner. In this case, however, if an insertible cup, such as shown in my prior patent #800080, of September 19, 1905, is not employed, and the kettle is constructed with special reference to my invention, I provide a concave recess $x'$ in the top of the kettle body $x$, as shown in Fig. 8, in the middle portion of which the opening $x^2$ is formed. Oppositely disposed notches, as indicated at $x^3$ in Fig. 9, are formed in the edge portion surrounding the opening $x^2$, and a cover $y$, having lugs or shoulders $y'$ thereon, is provided, all substantially as previously described with relation to the construction of Figs. 1 to 4. In this instance, however, the portion in front of the pivot shoulders $y'$ is of sufficient area to engage the under side of the body portion $x'$, while the portion in the rear thereof engages the upper side of said body portion when the cover is in its closed position.

In Figs. 6 and 7 I show another form of my invention, as applied to a coffee or tea pot $m$, which is open at its upper end and is provided with a pouring groove or lip $m'$. The cover or lid $n$ is similar to the cover $d$ already described, it being provided with strainer holes $n'$ adjacent said lip $m'$, which are covered by a valve plate $o$. In this form of my invention, however, I preferably provide a pair of pivot lugs $p$ in each side of the body $m$ and at opposite points, and I provide the lid $n$ with an upwardly projecting flange $n^2$, at each side thereof, each having therein an inclined slot $n^3$, which leads from the front end thereof and is adapted to receive the corresponding pivot pin $p$. Said flanges are extended about the rear portion of the lid and are practically continuous, the rear portion $n^4$ thereof being turned outwardly so that it engages or seats against the side of the vessel at its upper end. The portion of the lid in the rear of the slots $n^3$, or the rear portion thereof is counterweighted, as indicated at $q$, so as to hold said flange portion $n^4$ in engagement with said side, substantially as in the forms of my invention previously described. The front portion of the lid $n$ is of greater area than the rear portion, and is adapted to fit the corresponding portion of the vessel when in its normal position. In inserting the lid $n$ into the vessel, the front portion thereof is passed into the body in the rear of the pivot lugs $p$, so that the latter may enter the slots $n^3$ and pivotally support said lid. Obviously the slot may be formed in the wall of the receptacle and the pivot lug on the lid, as shown in Figs. 10 and 11, in which $m^0$ indicates the side wall having an open, forwardly extending, inclined slot $m^2$ therein and $n^0$ the lid which is provided with a pivot lug $m^4$ adapted to be passed into said slot, so as to be pivotally supported therein. This construction would be necessary when the receptacle was of earthenware, so that it would not be possible to solder the pivot lugs thereon. The pivot receiving slots are inclined upwardly from front to rear in each instance, so that they are moved towards the vertical as the receptacle is tipped to pour over its lip. If the slots were oppositely inclined or even vertical the cover might slip out of place when the receptacle was tipped.

A combined automatically opening and closing cover and strainer is thus provided, operating in the manner and having the advantages already described.

Having thus described my invention, what I claim as new and desire to secure by Letters Patent is:—

1. A receptacle having a top opening provided with a pouring lip in combination with a pivoted cover balanced normally to close said opening, engaging the receptacle to limit its closing movement, adapted to open automatically to permit the liquid to flow therein, and having a series of strainer openings formed therethrough, and a valve plate for closing said strainer openings connected to said cover, substantially as described.

2. A receptacle having a top opening provided with a pouring lip at one side, and means for normally closing said opening comprising a main valve adapted to open automatically to permit flow in one direction, and a supplemental valve adapted to open automatically to permit flow in the opposite direction, substantially as described.

3. A receptacle having a top opening provided with a pouring lip at one side, a pivoted cover normally closing said opening and movable to permit flow into said receptacle, said cover having an opening therethrough, and having a valve for normally closing said opening and movable to permit flow therethrough from the receptacle, substantially as described.

4. A receptacle having a top opening, a removable cover for closing said opening pivotally supported at each side thereof and intermediate its ends, one member of each pivoted support being provided with a pivot lug and the other with an open slot adapted to receive said lug, substantially as described.

5. A receptacle having a pouring lip at one side thereof and a top opening, and a removable cover for closing said opening, pivotally supported at each side thereof and intermediate its ends, one member of each pivotal support being provided with a pivot lug and the other with an open slot, inclined upwardly from said pouring lip and adapted to receive said pivot lug, substantially as described.

In testimony whereof, I have signed my name to this specification, in the presence of two subscribing witnesses.

ALONZO W. CRAM.

Witnesses:
L. H. HARRIMAN,
H. B. DAVIS.